W. P. WOODRUFF.
Piston-Packing.

No. 205,165. Patented June 18, 1878.

Attest:

INVENTOR:
William P. Woodruff
By Coyne & co. his
Attorneys.

UNITED STATES PATENT OFFICE.

WILLIAM P. WOODRUFF, OF CHICAGO, ILLINOIS, ASSIGNOR OF ONE-HALF HIS RIGHT TO JOHN A. BALDWIN, OF SAME PLACE.

IMPROVEMENT IN PISTON-PACKINGS.

Specification forming part of Letters Patent No. 205,165, dated June 18, 1878; application filed February 23, 1878.

*To all whom it may concern:*

Be it known that I, WILLIAM P. WOODRUFF, of Chicago, in the county of Cook and State of Illinois, have invented a new, useful, and Improved Steam-Packing, of which the following is a specification, reference being had to the accompanying drawing, forming a part hereof, and in which—

Figure 1:
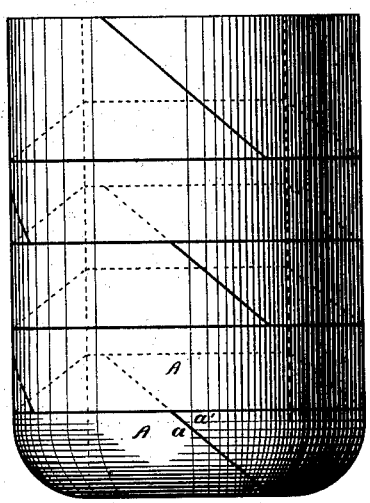
Figure 2:
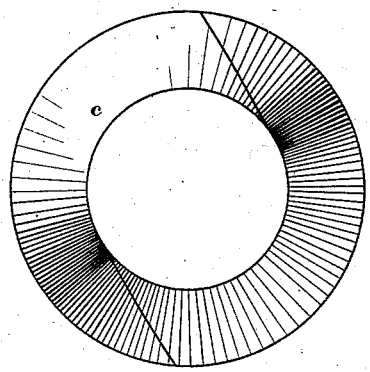
Figure 3:
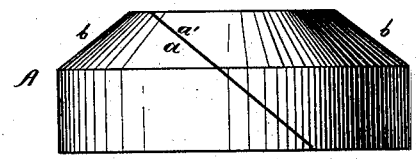

Figure 1 is a side view of a series of packing-rings made in accordance with my invention; Fig. 2, a bottom view of one of the said rings; Fig. 3, a central cross-section of the same, and Fig. 4 a side view of one of the rings.

Like letters of reference indicate like parts.

My object is to make an improved anti-friction material or composition for steam-packing. I also aim to improve the construction and operation of that class of steam-packing which consists of metallic rings.

For the accomplishment of these objects my invention consists of a composition made of the ingredients and in the proportions substantially as hereinafter described and set forth.

It further consists of packing-rings made in the form hereinafter specified.

I make the composition of metal; and it consists of four parts lead, six parts tin, two parts antimony, and one part copper, all melted together and made into a solid mass. This composition is sufficiently hard to be durable, and soft enough to wear into fit with the moving parts brought in contact therewith. It will also, to a great extent, diminish the friction heretofore occasioned by the use of many of the metallic packings generally used.

Figure 4:
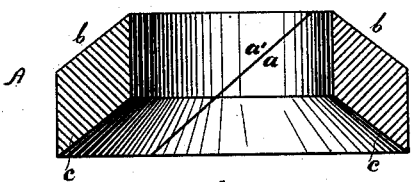

In the drawing, A represents a metallic ring for steam-packing. I make this ring in two parts or half-sections. One end of each part is beveled from the top downward, as shown at *a*, and the other from the bottom upward, as shown at *a'*, the slopes or bevels on the ends of one section matching those on the other, as if the sections were made by severing a continuous ring in the manner described. The sections may then be fitted together without leaving a very perceptible joint, as represented in Figs. 2, 3, and 4, and the sections will occupy the same plane and form a ring or anular part. I also bevel off the upper face of each section or ring, making the slope downward and outward from the inner edge or annulus, as shown at C. I also make the lower face of the ring parallel with the upper face, as shown at *c*, so that one ring may be set upon and fit the beveled face of the other, as represented in Fig. 1. When one ring is set upon another in this manner the joints between the sections should be broken, and one ring will tend to draw the beveled ends of the sections together, thus making a close joint there. The beveled faces of the rings will also be nicely fitted to each other.

The beveled ends of the sections may be moved on each other, and one ring may move on the other; but the construction and arrangement of the parts is such that it will be impossible for the steam to find a place of escape through the packing, even though such movements should result in opening one or more of the joints. This packing will tend to crowd itself against the piston-rod or other part surrounded by it, some part of the packing tending to keep in contact with the moving part.

In using these rings as many should be employed as may be required to fill the place to be packed.

When they are employed for packing an ordinary stuffing-box, the lower face of the lower ring, as represented in Fig. 1, may be rounded off to fit the seat of the box, and the upper face of the upper ring should be flat to receive the gland.

Having thus described my invention, what I claim as new, and desire to secure by Letters Patent, is—

1. A composition for metallic steam-packing, the said composition consisting of four parts lead, six parts tin, two parts antimony, and one part copper, all melted together and made into a solid mass, substantially as and for the purposes specified.

2. A packing consisting of two or more metal rings, each ring made in sections, and each section A A having oppositely-inclined or beveled ends $a$ and $a'$, and parallelly-inclined or sloping upper and lower faces $b$ and $c$, one face of each ring being thus made dish-shaped, and the opposite face formed and arranged to extend into the dish-shaped face of its fellow, substantially as and for the purposes specified.

WILLIAM P. WOODRUFF.

Witnesses:
J. F. OLMSTEAD,
D. J. MACKELLAR.